(12) United States Patent
Favero

(10) Patent No.: US 12,395,041 B2
(45) Date of Patent: Aug. 19, 2025

(54) PEDAL FOR BICYCLES WITH INTEGRATED GENERATOR

(71) Applicant: FAVERO ELECTRONICS S.R.L., Arcade (IT)

(72) Inventor: Gino Favero, Arcade (IT)

(73) Assignee: FAVERO ELECTRONICS S.R.L., Arcade (IT)

(*) Notice: Subject to any disclaimer, the term of this patent is extended or adjusted under 35 U.S.C. 154(b) by 158 days.

(21) Appl. No.: 18/008,593

(22) PCT Filed: Aug. 10, 2021

(86) PCT No.: PCT/IB2021/057366
§ 371 (c)(1),
(2) Date: Dec. 6, 2022

(87) PCT Pub. No.: WO2022/034497
PCT Pub. Date: Feb. 17, 2022

(65) Prior Publication Data
US 2023/0253860 A1  Aug. 10, 2023

(30) Foreign Application Priority Data

Aug. 10, 2020  (IT) .................. 102020000019885

(51) Int. Cl.
*H02K 7/18* (2006.01)
*B62J 45/41* (2020.01)
(Continued)

(52) U.S. Cl.
CPC ............ *H02K 7/1861* (2013.01); *B62J 45/41* (2020.02); *B62J 45/421* (2020.02); *B62M 3/08* (2013.01); *G01L 5/00* (2013.01); *G01L 5/0004* (2013.01)

(58) Field of Classification Search
CPC ...... H02K 7/1861; H02K 35/00; H02K 35/02; H02K 35/04; H02K 35/06; G01L 5/00;
(Continued)

(56) References Cited

U.S. PATENT DOCUMENTS 6,196,347 B1 * 3/2001 Chao .................... G01L 3/1435
180/220
11,001,327 B1   5/2021 Santurbane et al.
(Continued)

FOREIGN PATENT DOCUMENTS

CN       2471693 Y    1/2002
CN       203497117    3/2014
(Continued)

OTHER PUBLICATIONS

Hanazuka (JP 2008221880 A) English Translation (Year: 2008).*
(Continued)

*Primary Examiner* — Tulsidas C Patel
*Assistant Examiner* — Robert E Mates
(74) *Attorney, Agent, or Firm* — KLINTWORTH & ROZENBLAT LLP

(57) ABSTRACT

A pedal for bicycles comprising a pedal pin and a pedal body coupled in a freely rotatable manner on the pedal pin. An internal chamber obtained in the pedal pin has an internal surface extending along a reference axis approximately coaxial with the same. The pedal further comprises an electronic measurement system provided with deformation sensors configured to detect electric parameters indicative of the mechanical deformation of the pedal pin, an electronic circuit configured to determine, based on the electric parameters, the mechanical deformation of the pedal pin, and an electric generator which generates electrical power based on the rotation of the pedal body and is arranged in the internal chamber of the pedal pin.

14 Claims, 6 Drawing Sheets

(51) Int. Cl.
  *B62J 45/421* (2020.01)
  *B62M 3/08* (2006.01)
  *G01L 5/00* (2006.01)
(58) Field of Classification Search
  CPC ... B62M 3/08; B62M 3/16; B62J 45/41; B62J 45/421
  See application file for complete search history.

(56) References Cited

U.S. PATENT DOCUMENTS

| | | | |
|---|---|---|---|
| 2003/0035295 | A1* | 2/2003 | Chiu .................. B62M 3/08 362/473 |
| 2008/0236293 | A1* | 10/2008 | Meggiolan ............ B62M 3/003 280/281.1 |
| 2010/0024590 | A1 | 2/2010 | O'Neill et al. |
| 2011/0067503 | A1 | 3/2011 | Roudergues et al. |
| 2012/0166105 | A1 | 6/2012 | Biermann et al. |
| 2012/0234108 | A1 | 9/2012 | Janecek et al. |
| 2013/0024137 | A1 | 1/2013 | Grassi |
| 2014/0165779 | A1 | 6/2014 | Chen |
| 2014/0273543 | A1 | 9/2014 | Hanshew |
| 2015/0023033 | A1 | 1/2015 | Kuo |
| 2015/0377724 | A1 | 12/2015 | Benkert et al. |
| 2016/0052584 | A1 | 2/2016 | Sasaki |
| 2016/0209281 | A1 | 7/2016 | Carrasco Vergara et al. |
| 2016/0375953 | A1 | 12/2016 | Chen |
| 2017/0358731 | A1 | 12/2017 | Fukuda et al. |
| 2018/0229799 | A1 | 8/2018 | Lo |
| 2021/0331760 | A1 | 10/2021 | Fujimura et al. |
| 2021/0356338 | A1 | 11/2021 | Olsen et al. |

FOREIGN PATENT DOCUMENTS

| | | | |
|---|---|---|---|
| CN | 105405962 A | | 3/2016 |
| CN | 106476971 | | 3/2017 |
| CN | 207173874 | | 4/2018 |
| DE | 10007841 | | 9/2001 |
| DE | 202016000321 | | 4/2016 |
| DE | 202018005992 | | 3/2019 |
| EP | 2894088 A1 | | 7/2015 |
| EP | 3299067 | | 3/2018 |
| EP | 3566937 | | 11/2019 |
| FR | 2914902 | | 10/2008 |
| FR | 3078158 | | 8/2019 |
| JP | 2006168697 A | | 6/2006 |
| JP | 2008221880 | | 9/2008 |
| JP | 2008221880 A * | 9/2008 | .............. B62M 3/08 |
| JP | 2018051827 A | | 4/2018 |
| KR | 20110139069 A | | 12/2011 |
| KR | 102375427 | | 3/2022 |
| WO | 2008/109914 | | 9/2008 |
| WO | 2022018660 | | 1/2022 |
| WO | 2022034497 | | 2/2022 |

OTHER PUBLICATIONS

Define Relative, Microsoft Bing, Dec. 16, 2022 (Year: 2022) (4 pages).
International Search Report and Written Opinion of the International Searching Authority, dated Nov. 11, 2021, in connection with International Application No. PCT/IB2021/057366 (14 pages).
International Preliminary Report on Patentability, dated Nov. 4, 2022, in connection with International Application No. PCT/IB2021/057366 (6 pages).
Chinese Office Action issued in connection with CN Patent Application No. 202180040872.9 and machine translation thereof, dated May 28, 2024, 17 pages.
Second Office Action issued in connection with Chinese Patent Application No. 202180040872.9 and machine translation thereof, dated Nov. 20, 2024, 12 pages.

* cited by examiner

PEDAL FOR BICYCLES WITH INTEGRATED GENERATOR

CROSS-REFERENCE TO RELATED APPLICATIONS

This patent application claims priority from Italian patent application No. 102020000019885 filed on Oct. 8, 2020, the entire disclosure of which is incorporated herein by reference.

TECHNICAL FIELD

The present invention relates to a pedal for bicycles provided with an electronic measurement system designed to measure the force/power exerted by a cyclist on the pedal.

BACKGROUND ART

The use in bicycles, especially racing/road bicycles, of electronic measurement systems that determine and display a series of parameters/quantities useful for monitoring the physical activity carried out by the cyclist while pedalling, generally the force/power exerted on the pedal and pedalling cadence, is well known.

Electronic measurement systems generally comprise an electronic measurement device, which is arranged on the pedal to measure the aforementioned parameters and is designed to transmit the parameters in the form of data to a display device generally arranged at the front of the bicycle, which receives the data and shows it to the cyclist.

Electronic measurement devices are currently powered by replaceable or rechargeable batteries.

Electronic measurement devices provided with replaceable batteries are generally provided with a door that can be opened to access the battery, whereas those with rechargeable batteries require special charging connectors and charging power supply devices.

The use of rechargeable electric batteries avoids repeated interventions of replacement of the same with new batteries, thus reducing costs, inconvenience, and intervention time, but it has limitations. In particular, the charging connectors and the charging power supply device have a significant impact on the costs of the measurement device. If replaceable batteries are used, the externally accessible charging connector is also a critical component as it is exposed to the risk of damage as well as deterioration. Another technical problem is that the rechargeable battery in the exhausted condition can create a certain inconvenience for the cyclist when he/she cannot recharge it, especially in some conditions such as for example during a competition, or in the absence of the charging power supply device.

In order to overcome the above-described technical drawbacks, the Applicant filed Italian invention patent application no. 102018000002309, which describes a pedal for bicycles provided with an electronic measurement system provided with an electric generator which is designed to transform the mechanical energy developed by the cyclist while pedalling into electrical energy to supply power to the electric measurement system.

Although this solution, on the one hand, is advantageous in that it overcomes some technical drawbacks described above, on the other hand, the positioning of the electric generator outside the pedal pin has a significant impact on the overall dimensions of the electronic measurement device, exposing it to increased risk of damage in the event of accidental contact/impact while using the bicycle.

US2017/0358731 A1 describes a piezoelectric sensor arranged on the outer surface of a pedal pin.

DE10007841 A1 describes a device that transmits signals indicative of the pedalling, which comprises a permanent magnet arranged on an end portion of the pedal crank, and a Reed switch mounted on the pedal body.

US2016/052584 A1 describes the use of a piezoelectric device to generate power.

DISCLOSURE OF INVENTION

The object of the present invention is therefore to provide a pedal for bicycles which, in addition to maintaining the technical advantages of the solution described above, is also capable of overcoming the technical problems highlighted above and reducing the risk of damage to the electronic measurement system.

This object is achieved by the present invention in that it relates to a pedal for bicycles provided as defined in the appended claims.

BRIEF DESCRIPTION OF THE DRAWINGS

The present invention will now be described with reference to the accompanying drawings, which illustrate a non-limiting embodiment thereof, wherein.

BEST MODE FOR CARRYING OUT THE INVENTION

The present invention will now be described in detail with reference to the accompanying drawings in order to allow a skilled person to implement it and use it.

Various modifications to the described embodiments will be readily apparent to those skilled in the art and the general principles described may be applied to other embodiments and applications without however departing from the protective scope of the present invention as defined in the appended claims. Therefore, the present invention should not be construed as limited to the embodiments described and illustrated herein, but they must be given the broadest protective scope consistent with the principles and features described and claimed herein.

The present invention is essentially based on the idea of mounting, in an internal chamber of the pedal pin or in an external extension body coupled to the internal chamber, an electric generator which converts the mechanical energy generated and transmitted by the cyclist on the pedal during the pedalling into electrical power in order to power the electronic measurement system.

As will be described in detail below, one of the technical effects obtained thanks to this solution is, on the one hand, to eliminate the use of rechargeable batteries, connectors and/or devices for recharging them and, on the other hand, to conveniently use the pedal pin or its extension body as a container also for housing the electric generator, thereby obtaining full integration of the electronic measurement system inside the pedal pin or the extension body.

Figure 1:
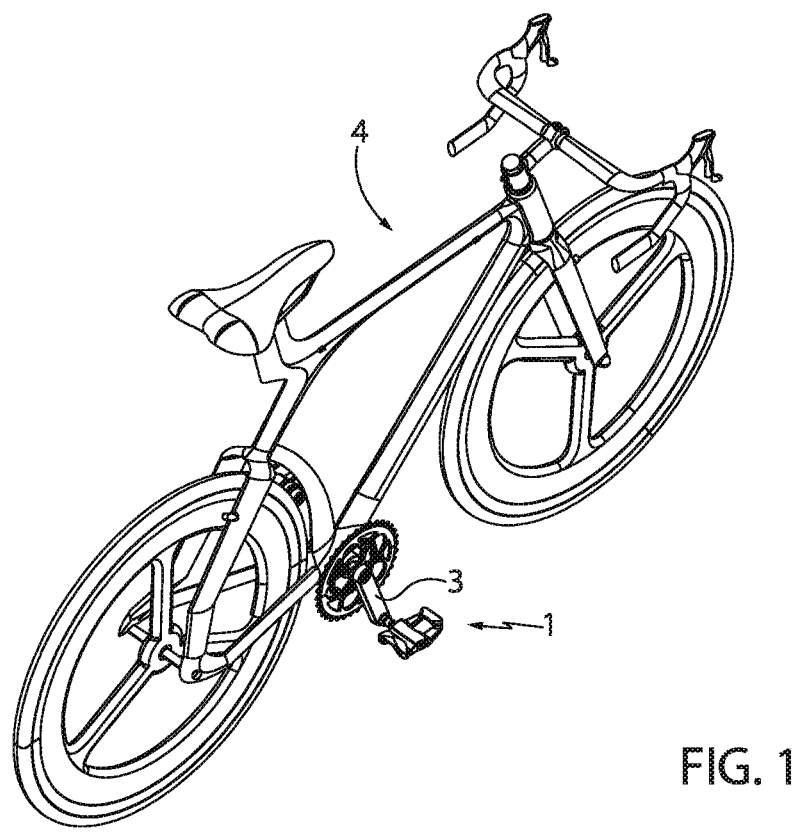
FIG. 1 schematically shows a bicycle equipped with a pedal for bicycles provided according to the teachings of the present invention.
Figure 2:
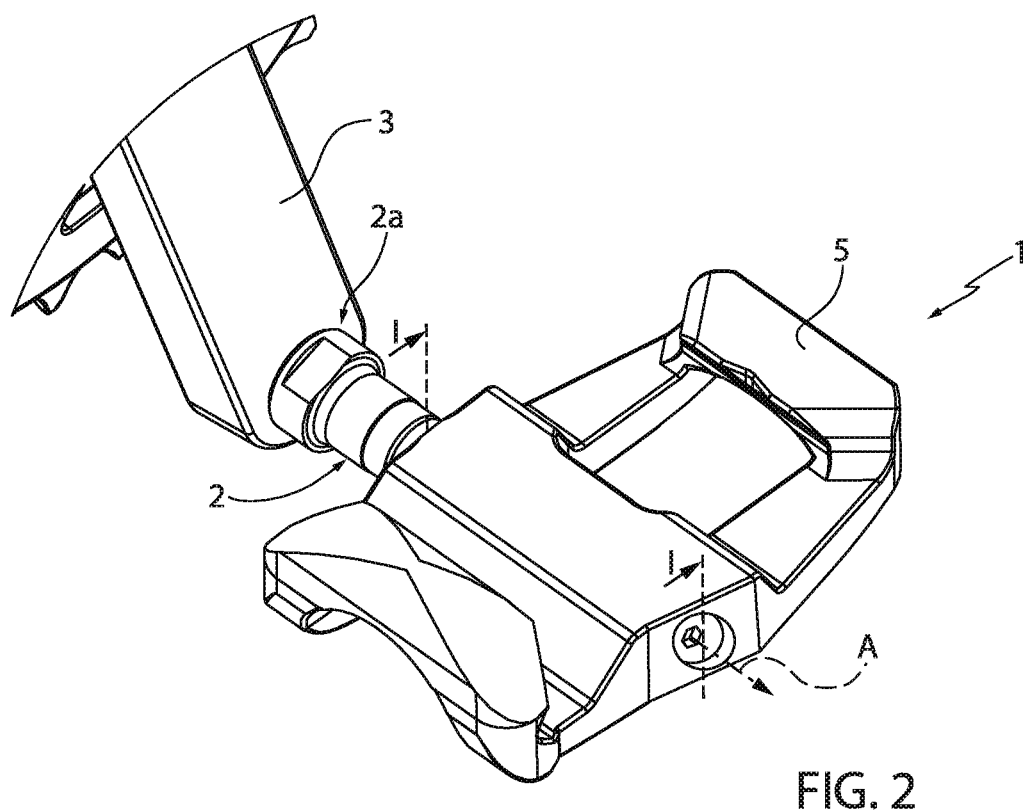
FIG. 2 is a perspective view in enlarged scale of the pedal shown in FIG. 1.

With reference to FIGS. 1 and 2, number 1 indicates, as a whole, a pedal for bicycles internally provided with an electronic measurement system, which is designed to measure electrical quantities indicative of a cyclist's pedal stroke.

The pedal 1 comprises a pedal pin 2 made in metallic material, extending along a longitudinal reference axis A and structured to be coupled to a pedal crank 3 of a bicycle 4.

Figure 3:
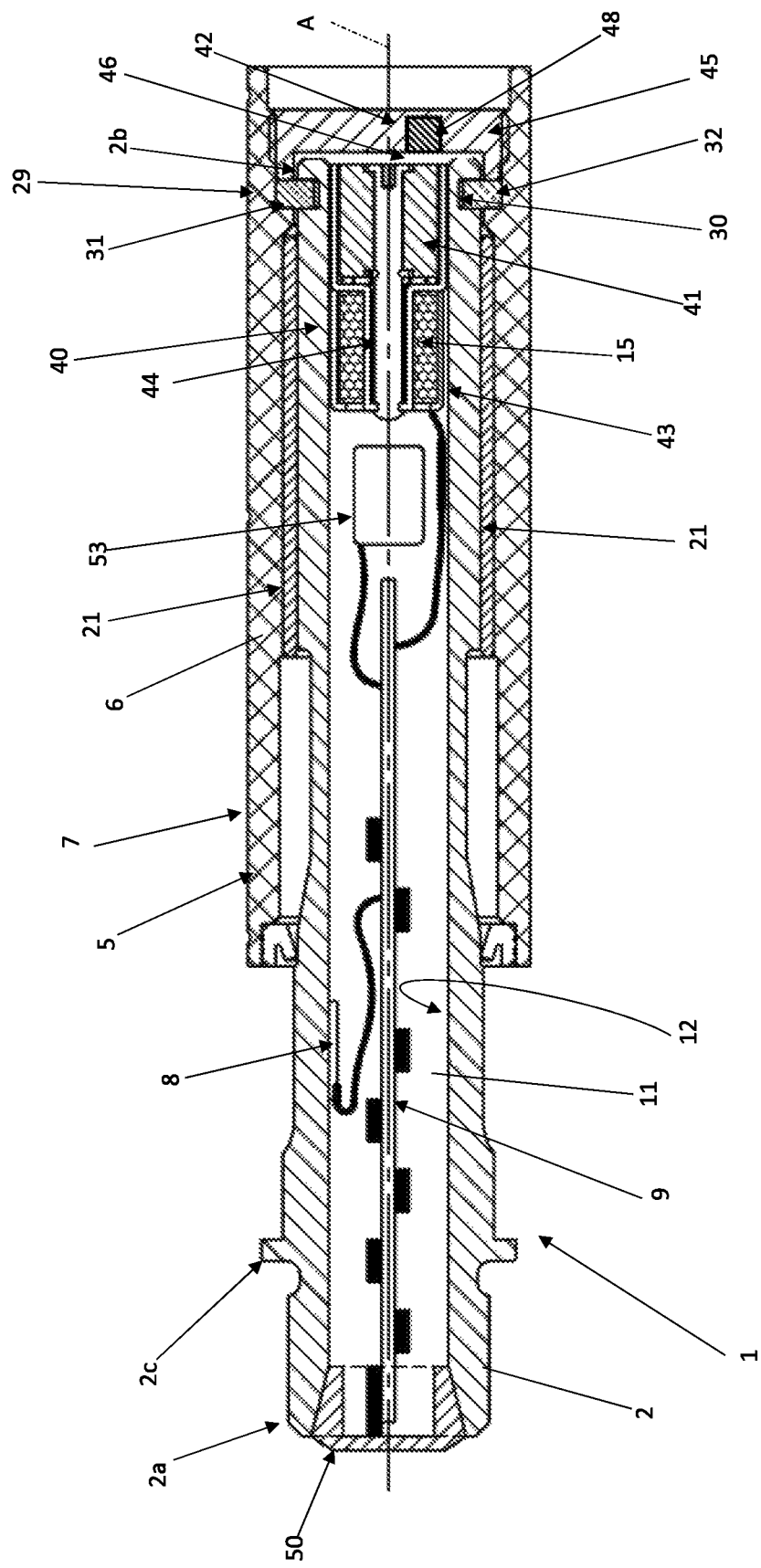
FIG. 3 is the longitudinal cross section I-I of the pedal shown in FIG. 2.

With reference to FIGS. 2 and 3, the pedal pin 2 may have a first end 2a, which is preferably threaded and is coupled to the corresponding pedal crank 3 of the bicycle 4. The pedal pin 2 may preferably have an elongated cylindrical shape and may stick out in cantilevered manner from the pedal crank 3 along the longitudinal axis A, preferably approximately orthogonal to the pedal crank 3. The pedal pin 2 also has a second end 2b axially opposite to the end 2a.

According to the example shown in FIGS. 1-3, the pedal pin 2 may comprise an annular crown or flange 2c coaxial with the axis A, which is positioned approximately at an inner annular edge of the threaded portion of the end 2a and designed to be arranged in abutment against the pedal crank 3 when the pedal 1 is connected to said pedal crank 3 (FIG. 2). With reference to the preferred embodiment shown in FIGS. 1-3, the pedal pin 2 may comprise a single portion, i.e., a single monolithic tubular body.

The pedal 1 further comprises a pedal body 5, which is coupled in a freely rotatable manner to the pedal pin 2, thus being able to rotate around the longitudinal axis A with respect to the pedal pin 2. In the example shown in FIG. 3, the pedal body 5 comprises a tubular body, i.e., a hub 6 internally having an opening or hole, preferably a through opening or hole with a circular section extending along the longitudinal axis A.

As shown in the example illustrated in FIG. 3, the hub 6 can be conveniently coupled by means of a bushing 21, or a bearing, in a freely rotatable manner on the pedal pin 2 so that it can rotate freely around the longitudinal axis A. According to the example shown in FIG. 3, the bushing 21 or bearing is fitted on the pedal pin 2 approximately in an intermediate position, approximately adjacent to the second end 2b.

In the example shown in FIGS. 2 and 3, the pedal body 5 further comprises a foot-rest portion 7, which is firmly/rigidly connected to the hub 6 so as to preferably form a one-piece or monolithic body therewith and structured to form a support body for the cyclist's foot. For example, the foot-rest portion 7 can comprise an approximately plate-like structure that extends on a platform approximately parallel to the longitudinal axis A, on which, in use, the cyclist's foot rests. It should be understood that the shape/structure of the foot-rest portion 7 can be different from the plate-like one mentioned above and/or shown in the attached Figures. It should also be understood that the foot-rest portion 7 can preferably be shaped/structured so as to be connected/hooked to a cyclist's shoe by means of notches/studs (or cleats) of a known type, generally used on the pedals of racing or mountain bikes.

The pedal 1 further comprises an electronic measurement device or system which is designed to measure the mechanical force/power exerted by the cyclist on the pedal 1 during the pedalling. The electronic measurement system is provided with a plurality of strain gauges 8 (only schematically shown in FIG. 3) which are connected to each other via electrical tracks to form one or more measurement circuits, preferably bridge circuits, and designed to provide electrical measurement signals indicative of the deformation of the pedal pin 2.

The electronic measurement system further comprises an electronic processing circuit 9 which is electrically connected to the strain gauges 8. The electronic processing circuit 9 is configured to determine the deformation of the pedal pin 2 caused by the force exerted by the cyclist on the pedal 1 and therefore on the pedal pin 2 during the pedalling, based on the electrical measurement signals.

It is understood that the electronic circuit 9 may preferably be configured to determine the force/power exerted by the cyclist on the pedal 1 and therefore on the pedal pin 2 during the pedalling based on the determined deformation, and communicate the deformation and/or the power/force in the form of data to a cyclist's display device, preferably a computer mounted on the bicycle 4 and/or a portable communication device (smartphone or the like).

The electronic measurement system further comprises an electric generator 40 which is designed to supply the electronic measurement system with the electrical power required for its operation.

As shown in FIG. 3, an internal opening or chamber 11 is made on/in the pedal pin 2, which extends along the axis A, preferably coaxial therewith, and has an internal surface 12 having a cross-section, orthogonal to the axis A, which is preferably approximately circular.

In the example shown in FIG. 3, the internal chamber 11 extends into the pedal pin 2 throughout the axial length of the pedal pin 2 between the two opposite ends thereof so as to form an axial through hole. It is understood that the present invention is not limited to an internal chamber 11 made in the manner illustrated in FIG. 1, i.e., formed by a through hole, but may alternatively provide other solutions. For example, according to one embodiment (not shown) alternative to the preferred embodiment described and illustrated above, the internal chamber 11 may be formed by a blind hole extending along the axis A, starting from one of the two axial ends 2a, 2b of the pedal pin 2 over a length smaller than that of the pedal pin 2.

With reference to FIG. 3, the electric generator 40 is coupled in the internal chamber 11 and is structured to transform the rotational movement of the pedal 1 with respect to the pedal crank 3 into electrical power. Preferably, the electric generator 40 is arranged in the internal chamber 11. Preferably, the electric generator 40 is arranged inside the internal chamber 11, preferably at an axial end of the pedal pin 2. For example, the electric generator 40 may be conveniently arranged in the internal chamber 11 so as to be adjacent to the bushing 21 at the end 2b of the pedal pin 2.

According to the preferred embodiment shown in FIG. 3, the electric generator 40 comprises a magnetic rotor 41 which is arranged inside the internal chamber 11 so as to rotate around the reference axis A.

The electric generator 40 further comprises a connection device 42 mechanically connecting the magnetic rotor 41 to the pedal body 5 so that the rotation of the pedal body 5 around the reference axis A causes a rotation of the magnetic rotor 41 around said reference axis A.

The electric generator 40 also comprises an electric stator 43 which is arranged inside the internal chamber 11 and designed to generate electrical power based on the rotation of the magnetic rotor 41 in the internal chamber 11 around the reference axis A. The electric stator 43 and the magnetic rotor 41 may be arranged in the internal chamber 11 alongside each other, preferably coaxial with the axis A.

According to a preferred embodiment shown in FIG. 3, the electric stator 43 has an approximately cylindrical shape and is sized so as to be arranged in the internal chamber 11 while remaining coaxial with the axis A. In the example shown, the electric stator 43 is stably fixed to the internal surface 12 of the internal chamber 11 so that it is angularly integral with the pedal pin 2.

According to a preferred embodiment, shown in FIG. 3, the stator 43 extends at least partially outside the magnetic rotor 41 along the axis A so as to contain it therein. In other words, the stator 43 is structured to extend along the axis A and has a portion at least partially housing therein the magnetic rotor 41.

In the example shown, the stator 43 is formed by a cylindrical tubular cage structure. The magnetic rotor 41 has a cylindrical shape and is axially engaged in a cylindrical tubular half portion of the stator 43. The electric stator 43 may comprise, for example, a series of coils 15 provided with ferromagnetic bodies and with electric windings coupled to the ferromagnetic bodies. According to an exemplary embodiment, the magnetic rotor 41 may comprise an approximately annular or approximately semi-annular multi-pole permanent magnet arranged in the pedal pin 2.

The electric stator 43 may comprise a central winding, and preferably a metal cage keyed inside the internal chamber 11 and provided with a series of metal blades, which alternatively wrap the central winding along its circumference and then extend laterally around the rotor 41. The rotation of the magnetic rotor 41 made with a multi-pole permanent magnet in the internal chamber 11 induces a change in the electromagnetic field on the metal cage and on the central winding of the stator 43, thereby generating electrical power.

The Applicant found out that a particularly convenient electric generator is the claw-pole generator suitably designed to position the rotor axially alongside the stator.

It is understood that the structure of the electric generator 40 may be different from that described above.

According to the preferred embodiment shown in FIG. 3, the magnetic rotor 41 may be mounted idly on a shaft 44. Preferably, the shaft 44 may extend into the internal chamber 11 coaxial with the axis A and be positioned at least partially within the electric stator 43. Preferably, the shaft 44 is stably connected to an internal wall of the electric stator 43. Preferably, the shaft 44 projects cantilevered from the internal wall of the electric stator so as to extend along the axis A and have the end opposite the electric stator 43 arranged approximately at the opening of the internal chamber 11 at the end 2b of the pedal pin 2.

According to the preferred embodiment shown in FIG. 3, a cap 45 designed to rotate together with the pedal body 5 around the axis A is coupled in an angularly integral manner to the end of the pedal body 5 arranged in proximity to the end 2b of the pedal pin 2.

According to the embodiment shown in FIG. 3, the cap 45 may be cylindrical and disc-shaped and have an outer threaded portion screwed onto a circular threaded portion formed inside the pedal body 5 so as to be angularly integral therewith.

In the example shown, the connection device 42 may comprise the cap 45 and a magnetic coupling device 46 magnetically connecting the cap 45 to the rotor 41, so that the rotation of the pedal body 5 is transmitted to the rotor 41 via the cap 45. In the example shown, the magnetic coupling device 46 comprises at least one magnet 48, which is arranged on/in the cap 45 and designed to exert a magnetic attraction on the rotor 41 so as to drag it into rotation during the rotation of the cap 45.

It is understood that the magnetic coupling device 46 according to the present invention is not limited to the embodiment providing a magnet 48 on/in the cap 45, but may provide other alternative embodiments, such as, for example, the construction of the cap 45 with ferromagnetic material and the installation of a magnet 48 in the rotor 41, or the use of two magnetic elements 48 having magnetic poles opposite one another. For example, the two magnetic elements 48 may be installed in the cap 45 and in the electric rotor 41, respectively. The two magnetic elements 48 may comprise respective magnets having opposite magnetic polarity. In use, the two magnetic elements attract one another, causing the magnetic rotor 41 to be angularly connected to the cap 45.

It is also understood that the present invention is not limited to a connection device 42 consisting of the magnetic coupling system 46 but can provide other embodiments. For example, according to a further different alternative embodiment (not shown), the connection device 42 may comprise a friction coupling mechanism provided with two discs, made of rubber material for example, which are connected to the rotor 41 and the cap 45, respectively, and are arranged with their faces adjacent and in abutment against each other.

It is also understood that the present invention is not limited to the use of an electric generator of the "electromagnetic" type but may alternatively provide the use of one of the following electric generators: a piezoelectric generator, or a triboelectric generator, or a magnetostrictive generator, or a switched reluctance generator. The piezoelectric generator, or a triboelectric generator, or a magnetostrictive generator, or a switched reluctance generator is arranged in the internal chamber 11.

With reference to FIG. 3, the strain gauges 8 are stably coupled to the pedal pin 2. Preferably, the strain gauges 8 are stably coupled in the internal chamber 11 of the pedal pin 2. Preferably, the strain gauges 8 are stably fixed to the internal wall or surface 12 of the internal chamber 11 of the pedal pin 2. Conveniently, the strain gauges 8 can have a very flexible thin laminar structure. The strain gauges 8 may comprise at least one thin film of highly flexible, electrically insulating material (springs) and one or more strain gauge measuring grids, which are stably arranged on/in the film. The film may preferably have a quadrangular, for example rectangular or square shape, and is stably fixed to the internal surface 12 of the internal chamber 11 by means of a fixing layer based on adhesive material. According to the preferred embodiment shown in FIG. 3, the strain gauges 8 are positioned on the internal surface 12 of the pedal pin 2 so as to be conveniently arranged approximately between the bushing 21 and the flange 2c.

It is understood that according to a variant of the present invention, the strain gauges 8 can be coupled to the pedal pin 2 by using a support or insert (not shown) arranged in the internal chamber 11. In this case, the strain gauges 8 can be stably fixed to the support or insert which is arranged/engaged at least partially inside the internal chamber 11.

According to the preferred embodiment shown in FIG. 3, the electronic circuit 9 is conveniently arranged inside the internal chamber 11. In the example shown, the electronic circuit 9 is arranged inside the internal chamber 11 so that it is surrounded by the strain gauges 8 fixed to the internal surface 12 and is axially positioned approximately alongside the electric generator 11. The electronic circuit 9 may comprise, for example, a quadrangular Printed Circuit Board (PCB).

According to a preferred embodiment, the electronic circuit 9 is also electrically connected to the electric generator 40 and to the strain gauges 8 by means of electrical connection wires or circuits.

The electronic measurement system may further comprise an energy storage device 53 and a voltage regulator circuit (not shown). The voltage regulator circuit can be electrically connected: to the electric stator 43 to receive therefrom the electrical power generated, and to the energy storage device 53 to supply it with electrical power preferably modified/regulated according to a predetermined value. The energy storage device 53 may comprise, for example, a lithium-ion rechargeable mini-buffer battery (small-size battery), or a capacitor or super-capacitor, or any similar rechargeable mini-battery. The energy storage device 53 may be configured to power the electronic circuit 9 in the non-pedalling intervals during which the electric stator 43 does not generate energy.

According to the preferred embodiment shown in FIG. 3, the pedal 1 further preferably comprises a mechanical clamping member 29 which is structured so as to axially clamp the hub 6 of the pedal body 5 to the pedal pin 2 in order to prevent the pedal body 5 from slipping off of the pedal pin 2 along the longitudinal reference axis A.

Figure 4:
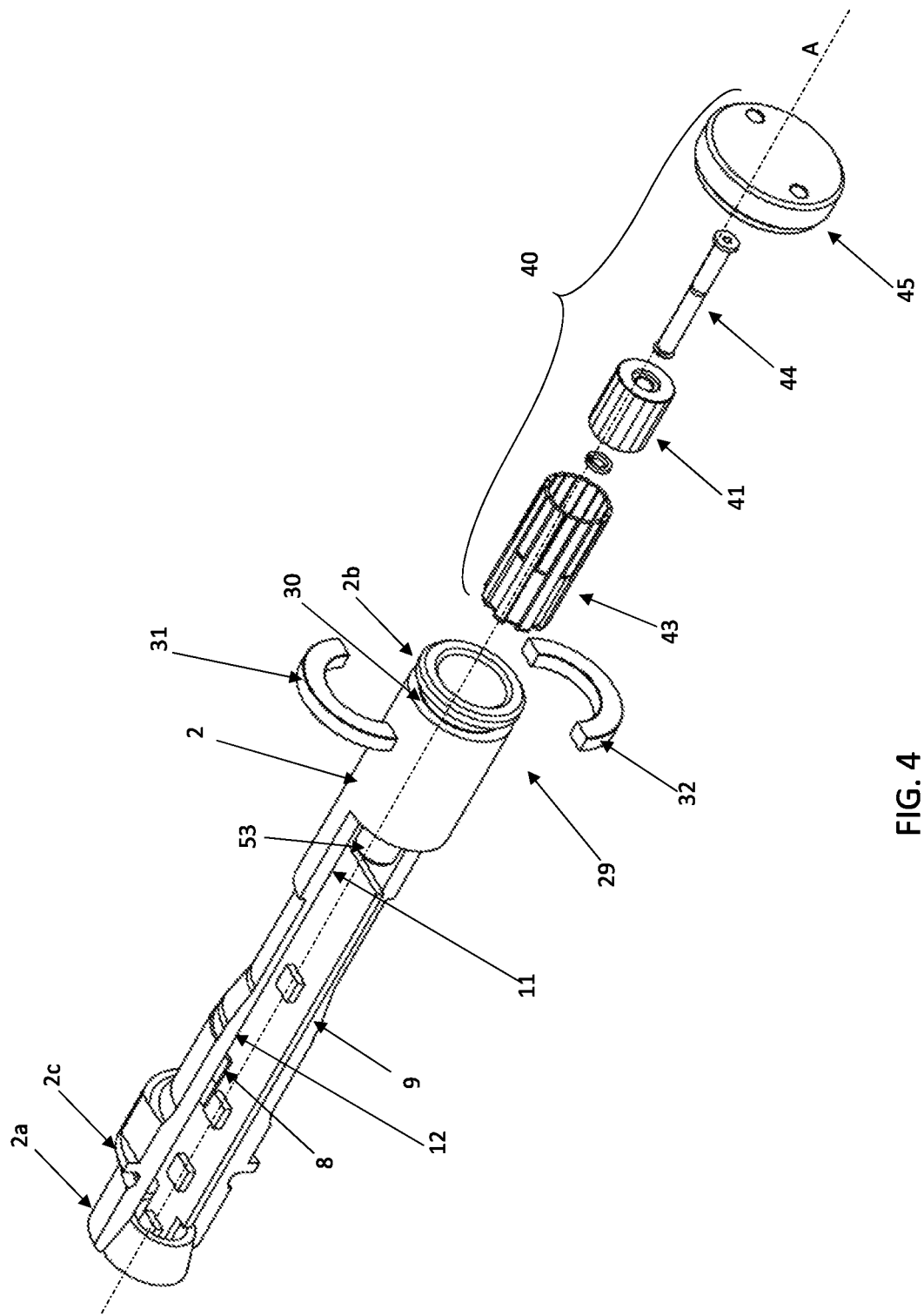
FIG. 4 is an exploded view, with partially cross section parts and parts removed for clarity, of the pedal pin containing the processing circuit and the electric generator of the pedal shown in FIGS. 1 and 2.

According to an exemplary embodiment shown in FIG. 3, an annular seat 30 coaxial with axis A is obtained on the pedal pin 2. The annular seat 30 on the inside has a cylindrical bottom wall and two side walls which define two annular shoulders on the pedal pin 2. According to the embodiment shown in FIG. 3, the annular seat 30 and the corresponding annular shoulders are formed on the edge of the pedal pin 2 adjacent to the end 2b. In the example shown in FIG. 3 and FIG. 4, the mechanical clamping member 29 further comprises two distinct and independent semi-annular bodies 31 and 32 having cross sections in the form of semi-circular segments preferably approximately complementary to each other and to the annular seat 30. The two semi-annular bodies 31 and 32 are arranged in the annular seat 30 so that they can freely rotate therein around the axis A with respect to the pedal pin 2. The two semi-annular bodies 31 and 32 are structured so as to preferably abut against the annular shoulders of the annular seat 30 so as to remain axially clamped and not capable of moving with respect to the pedal pin 2 along the longitudinal axis A. The two semi-annular bodies 31 and 32 radially project from the seat 30 and are arranged in abutment against an inner annular shoulder of the hub 6, which is, in turn, interposed between the seat 30 and the axial end of the bushing 21.

According to the preferred embodiment shown in FIG. 3, the closure cap 45 may be in the form of an externally threaded cup-shaped body which is screwed onto the inner threaded edge of the hub 6 and is arranged in abutment against the projecting portion of the semi-annular bodies 31 and 32. The closure cap 45 axially retains the hub 6 so as to lock the axial movement thereof.

According to the preferred embodiment shown in FIG. 3, the opening of the internal chamber 11 obtained at the end 2a of the pedal pin 2 can be closed in turn by a cap 50 engaged therein.

The operation of the pedal 1 is clear from the above description. The rotor 41 is driven into rotation in the internal chamber 11 by the pedal body 5 and induces a variation of flux in the windings of the stator 43 which, consequently, generate the electrical power supply. The magnetic rotor 41 and the electric stator 43 form a mini-alternator (dynamo) conveniently mounted inside the internal chamber 11, in which both the stator and rotor components are housed in the internal chamber 11 of the pedal pin 2.

The pedal described above is advantageous in that it eliminates the use and/or the need to replace or recharge the traditional electric battery. Accordingly, the electrical measurement system is completely autonomous from the energy point of view. Eliminating the rechargeable battery also simplifies the measurement system as the charging system and its components, such as the connectors on the pedal, are completely eliminated.

Moreover, since the electrical power required by the meter is a total of a few milliwatts, it is possible to use an electric generator of moderate size and cost. Furthermore, the reliability and the service life of the system are particularly high, since the number of revolutions of the pedal is limited, generally between about 60 and 120 rpm.

Lastly, it is clear that modifications and variations may be made to the pedal described and illustrated above without however departing from the scope of the present invention.

Figure 5:
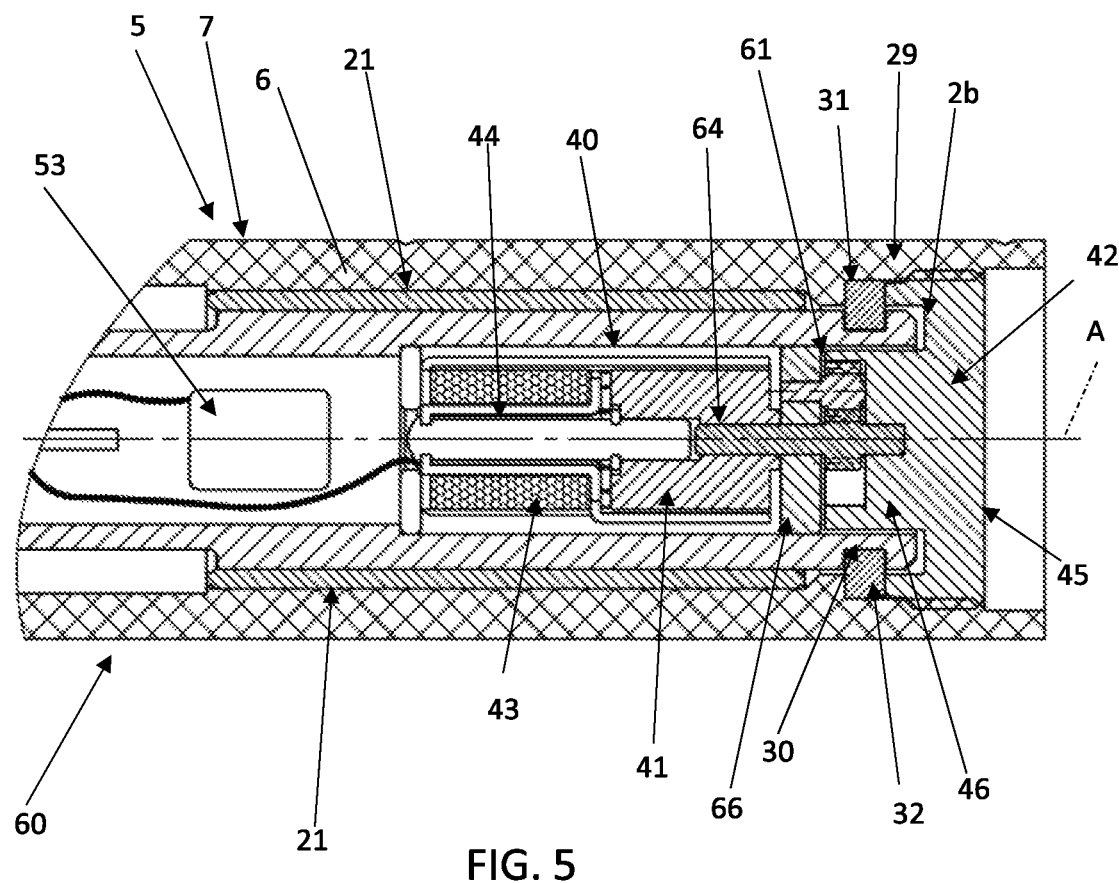
FIG. 5 shows a portion of a longitudinal cross section of the pedal according to a first embodiment.

The embodiment shown in FIG. 5 relates to a pedal 60 (only partially shown in section), which is similar to pedal 1, and whose component parts will be identified, where possible, with the same reference numbers that identify corresponding parts of pedal 1.

Figure 6:
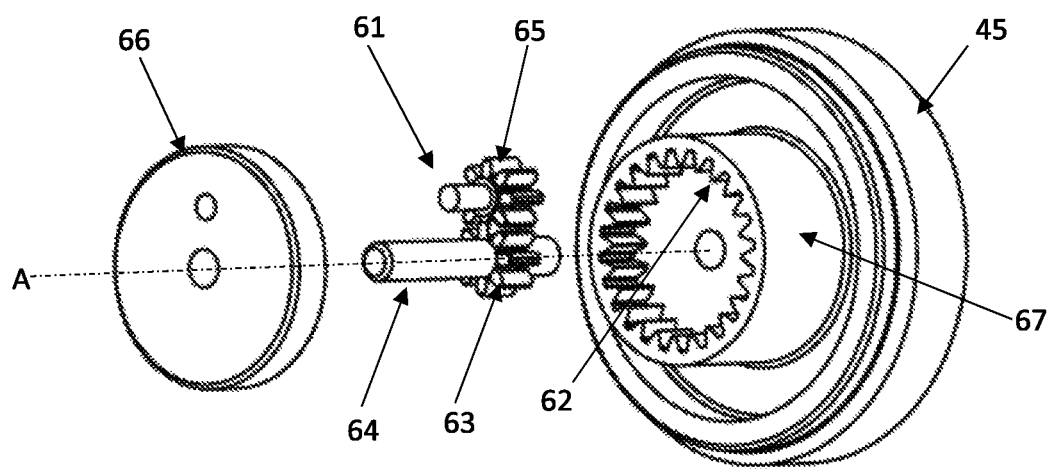
FIG. 6 is an exploded view of the connection device used in the pedal shown in FIG. 5.

The pedal 60 shown in FIG. 5 differs from the pedal 1 in that the connection device 42 may comprise a speed multiplier mechanism 61. As shown in FIGS. 5 and 6, the speed multiplier mechanism 61 may comprise an epicyclic mechanism structured to cause the transmission ratio between the pedal body 5 and the magnetic rotor 41 to be multiplying. The Applicant found that the speed multiplier mechanism 61 allows the number of revolutions of the rotor 41, and consequently the electrical power supplied by the electric generator 40, to be increased.

In the example shown in FIGS. 5 and 6, the speed multiplier mechanism 61 comprises: a crown wheel 62 formed inside a cylindrical portion 67, which is stably fixed to the inner face of the cap 45 so as to protrude, and is engaged in the internal cavity 11; a central cogwheel 63 angularly integral with the rotor 41 by means of a shaft 64, and a cogwheel 65 which is interposed between the crown wheel 62 and the central cogwheel 63. In the example shown, the shaft 64 extends parallel to the axis A and is engaged in a freely rotatable manner in a through hole formed in a disc-shaped support element 66 arranged in turn in the internal chamber 11 between the cylindrical portion 67 and the rotor 41.

Figure 7:
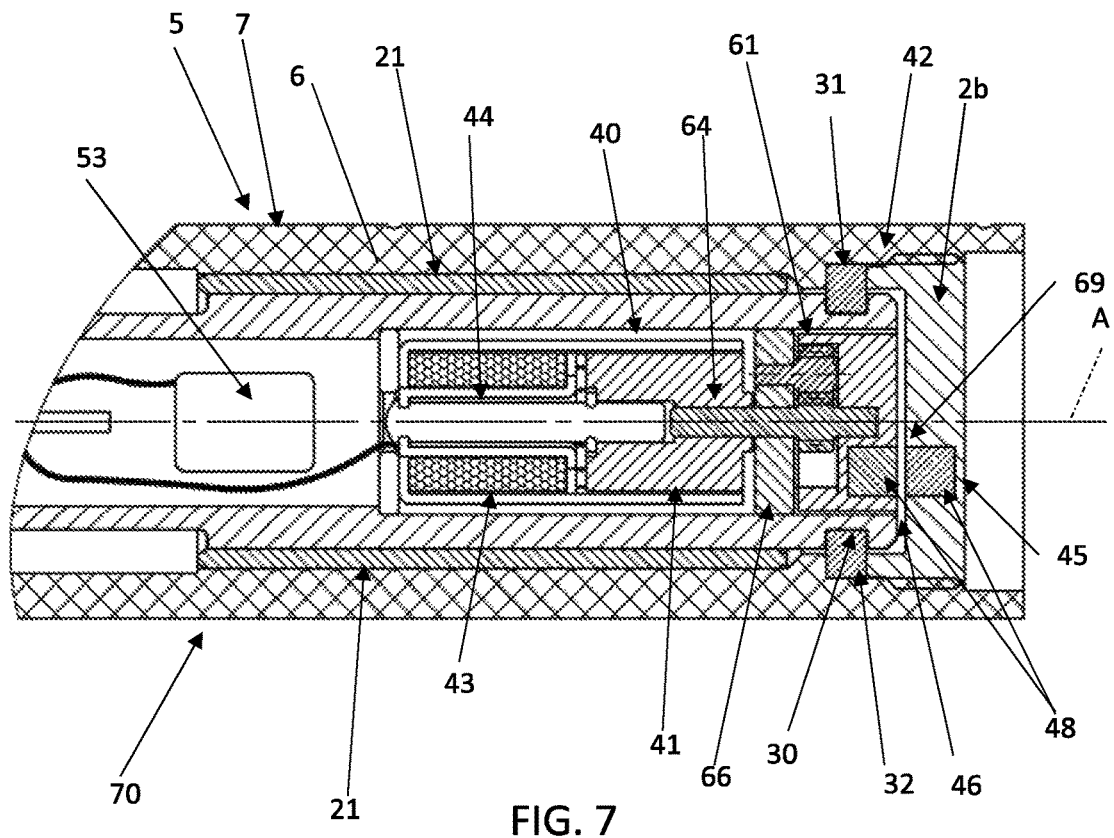
FIG. 7 shows a portion of a longitudinal cross section of the pedal in a second embodiment.

The embodiment shown in FIG. 7 relates to a pedal 70, which is similar to pedal 60 (shown in FIGS. 5 and 6), and whose component parts will be identified, where possible, with the same reference numbers that identify corresponding parts of pedal 1.

Figure 8:
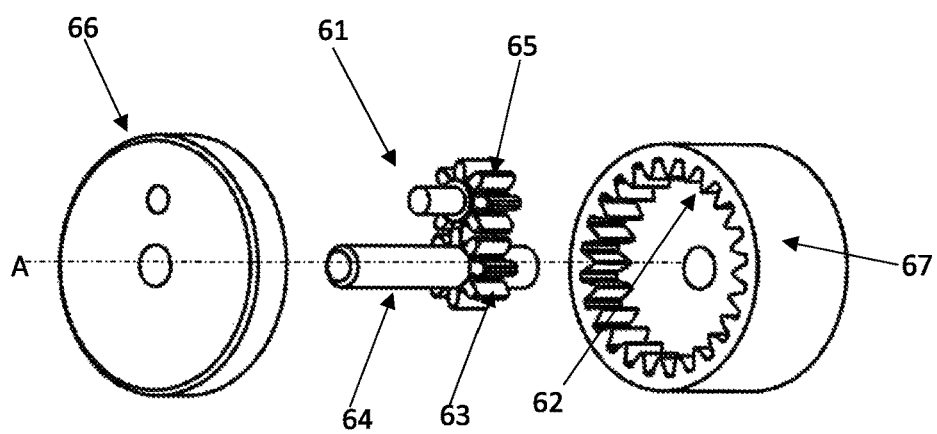
FIG. 8 is an exploded view of the connection device used in the pedal shown in FIG. 7.

The pedal 70 shown in FIG. 7 and FIG. 8 differs from the pedal 60 in that the cylindrical portion 67 is separated from the cap 45 and is connected thereto by means of a magnetic coupling system 69 provided with two magnetic elements 48 arranged on the cap 45 and the cylindrical portion 67, respectively. The cylindrical portion 67 is mounted idly in the internal chamber 11 so that it can rotate freely around the axis A. In use, when the cap 45 rotates, it drives the cylindrical portion 67 into rotation around the axis A by means of the magnetic coupling system 69. The rotation of the crown wheel 62 is transmitted to the rotor 41 via the cogwheels 63 and 65 of the speed multiplier mechanism 61.

Figure 9:
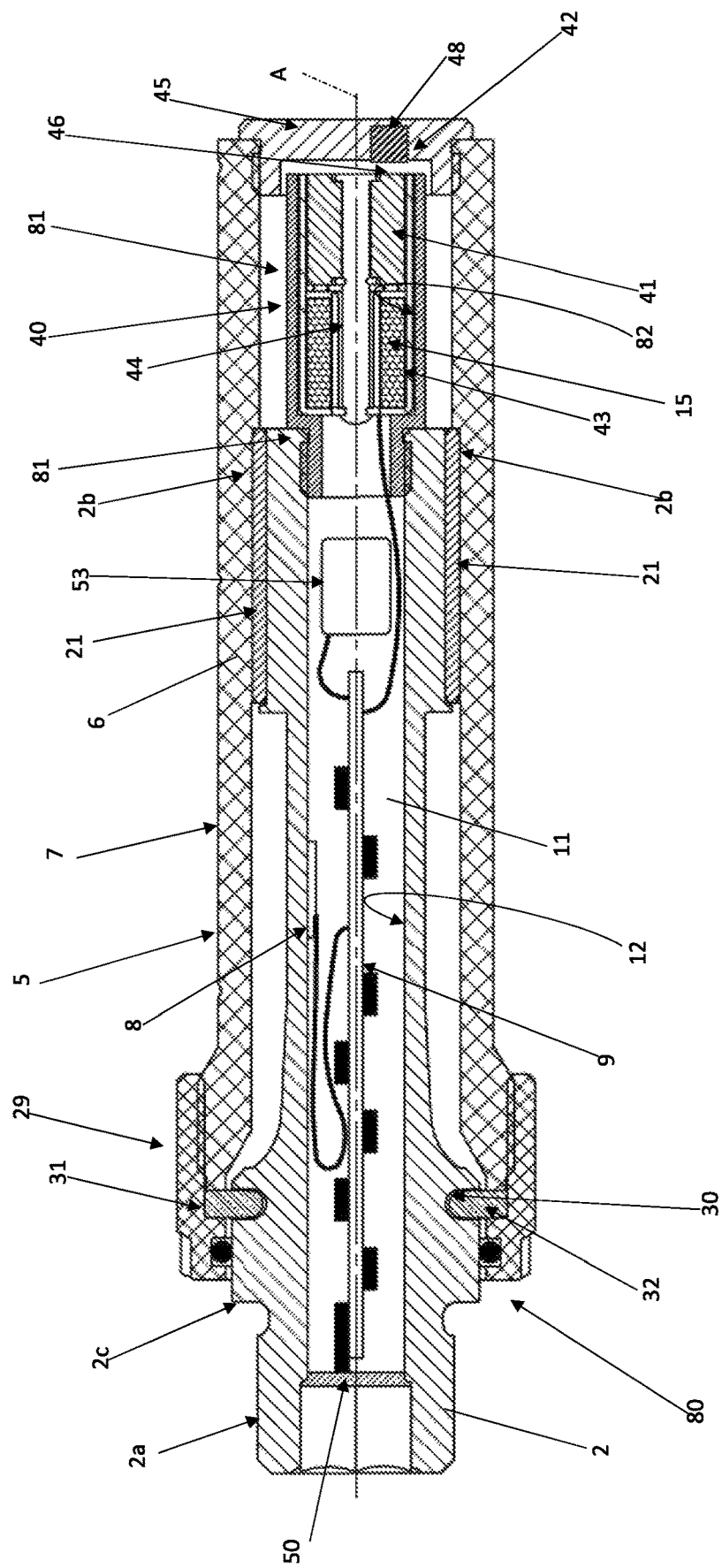
FIG. 9 is a longitudinal cross section of a pedal according to a third embodiment.

Lastly, the embodiment shown in FIG. 9 relates to a pedal 80, which is similar to pedal 1 (shown in FIGS. 1-3), and whose component parts will be identified, where possible, with the same reference numbers that identify corresponding parts of pedal 1.

The pedal 80 shown in FIG. 9 differs from the pedal 1 in that the electric generator 40 is coupled to the internal chamber 11 by means of an extension body 81. The pedal 80 shown in FIG. 9 also differs from the pedal 1 in that the clamping device 29, instead of being arranged at the end 2b of the pedal pin 2, is arranged approximately on the opposite side, i.e., at the end 2a. It is understood that this variant is not limited to the positioning of the clamping device 29 as shown in FIG. 9 but can provide other positions of the clamping device 29 along the axis A, such as for example at the end 2b as in the previous embodiments described above.

According to the embodiment shown in FIG. 9, the extension body 81 is coupled to the internal chamber 11 at the end 2b of the pedal pin 2 opposite the pedal crank 3. The extension body 81 is also arranged inside the pedal body 5. According to the embodiment shown in FIG. 9, the extension body 81 has a cylindrical shape and is coupled to the end 2b of the pedal pin 2 so as to project cantilevered therefrom. The extension body 81 on the inside has an internal seat or chamber 82. The internal seat or chamber 82 houses the electric generator 40. The internal seat or chamber 82 extends into the extension body 81 coaxial with the axis A and can comprise an opening adjacent to and communicating with the opening of the internal cavity 11 formed at the end 2b of the pedal pin 2. In particular, the extension body 81 can comprise a tubular element having a circular cross-section transverse to the axis A, wherein the internal seat or chamber 82 can correspond to the inner space of said tubular element.

In the embodiment shown in FIG. 9, the extension body 81 constitutes a portion of the pedal pin 2. In other words, the extension body 81 is an axial extension of the pedal pin 2. In the embodiment shown in FIG. 9, the pedal pin 2 is formed by two portions coupled to each other in a stable but removable manner. One of the two portions, opposite the pedal crank 3, is formed by the extension body 81. A first portion has the end 2a connected to the pedal crank 3 (shown on the left in FIG. 9), whereas the second portion is connected, preferably but not necessarily stably, to the end 2b of the first portion and defines the extension body 81. The second portion of the pedal pin 2 comprises the internal cavity 82 which houses the electric generator 40. The electric generator 40 is arranged in the internal seat or chamber 82 of the second portion of the pedal pin 2, which is opposite the pedal crank 3. The second portion of the pedal pin 2 is not part of the pedal crank 3 and is formed by the extension body 81 coupled to the first portion.

The invention claimed is:

1. A pedal for bicycles comprising:
a pedal pin extending along a longitudinal reference axis and having a first axial end structured to be coupled to a pedal crank of a bicycle,
a pedal body coupled in a freely rotatable manner on said pedal pin thus being able to rotate around said reference axis,
at least one internal chamber is made in said pedal pin, having an internal surface extending in the pedal pin along said reference axis coaxial to the same,
an electronic measurement system which is designed to determine the mechanical force/power exerted by the cyclist on said pedal during the pedalling and comprises:
deformation sensors which are coupled to said pedal pin and are configured in order to provide electrical measurement signals indicative of the mechanical deformation of said pedal pin,
electronic means which are electrically connected to said deformation sensors and are configured so as to determine, based on said electrical measurement signals, the mechanical deformation of said pedal pin caused during the pedalling by said mechanical force exerted by the cyclist on the pedal pin through the pedal body, and
an electric power-supply device which is designed to provide the electrical power for the operation of the electronic measurement system,
said pedal being characterised in that:
said electric power-supply device comprises an electric generator which is arranged inside said internal chamber of said pedal pin, and is structured to convert the rotational movement of said pedal into electrical power and said electric generator comprises:
a magnetic rotor that is designed to rotate around said reference axis,
a connection device designed to connect the magnetic rotor to said pedal body so as that the rotation of the pedal body around said reference axis causes a rotation of the magnetic rotor around said reference axis,
an electric stator which is angularly fixed relative to said pedal pin and is designed to generate electrical power based on the rotation imparted on the magnetic rotor by the pedal body around said axis.

2. The pedal according to claim 1, wherein said pedal pin comprises a first portion having a first axial end designed to be connected to the pedal crank, and a second portion which is coupled to a second axial end of the first portion and defines an extension body; said electric generator is arranged inside said internal chamber of said extension body.

3. The pedal according to claim 1, wherein said electric stator is stably fixed to an internal surface of the internal chamber so that it is angularly integral with said pedal pin.

4. The pedal according to claim 1, wherein said electric stator extends into the internal chamber along said axis alongside said magnetic rotor and is structured so as to contain, at least partially, said magnetic rotor therein.

5. The pedal according to claim 1, wherein said magnetic rotor is idly mounted on a shaft extending into said internal chamber coaxial with said axis; said magnetic rotor is positioned at least partially inside said electric stator.

6. The pedal according to claim 5, wherein said shaft is stably connected to an inner wall of said electric stator and projects cantilevered therefrom so as to extend along said axis and have the end opposite said electric stator arranged approximately at an opening of said internal chamber at one end of said pedal pin.

7. The pedal according to claim 1, wherein said connection device comprises a spin multiplier mechanism.

8. The pedal according to claim 1, wherein said connection device comprises a gear mechanism or an epicyclic mechanism.

9. The pedal according to claim 1, wherein said connection device comprises a magnetic coupling device.

10. The pedal according to claim 9, wherein
said connection device comprises a cap connected in an angularly integral manner to one end of said pedal body,
said magnetic coupling device magnetically connects said cap to said rotor, so that the rotation of said pedal body is transmitted to said rotor via said cap.

11. The pedal according to claim 1, wherein
said connection device comprises a cap connected in an angularly integral manner to one end of said pedal body,
said connection device comprises a friction coupling mechanism provided with two discs, which are connected to said rotor and said cap, respectively, and are arranged with their faces adjacent and in abutment against each other.

12. The pedal according to claim 1, wherein said deformation sensors are fixed on the internal surface of said internal chamber.

13. The pedal according to claim 1, wherein said electric generator comprises: a piezoelectric generator, or a triboelectric generator, or a magnetostrictive generator, or a switch reluctance generator.

14. A pedal for bicycles comprising:
a pedal pin extending along a longitudinal reference axis and having a first axial end structured to be coupled to a pedal crank of a bicycle,
a pedal body coupled in a freely rotatable manner on said pedal pin thus being able to rotate around said reference axis,
at least one internal chamber is made in said pedal pin, having an internal surface extending in the pedal pin along said reference axis coaxial to the same,
an electronic measurement system which is designed to determine the mechanical force/power exerted by the cyclist on said pedal during the pedalling and comprises:
deformation sensors which are coupled to said pedal pin and are configured in order to provide electrical measurement signals indicative of the mechanical deformation of said pedal pin,
electronic means which are electrically connected to said deformation sensors and are configured so as to determine, based on said electrical measurement signals, the mechanical deformation of said pedal pin caused during the pedalling by said mechanical force exerted by the cyclist on the pedal pin through the pedal body, and
an electric power-supply device which is designed to provide the electrical power for the operation of the electronic measurement system,
said pedal being characterised in that:
said electric power-supply device comprises an electric generator which is arranged inside said internal chamber of said pedal pin, and is structured to convert the rotational movement of said pedal into electrical power, wherein said electronic means are arranged inside said internal chamber.

* * * * *